Figure 1:
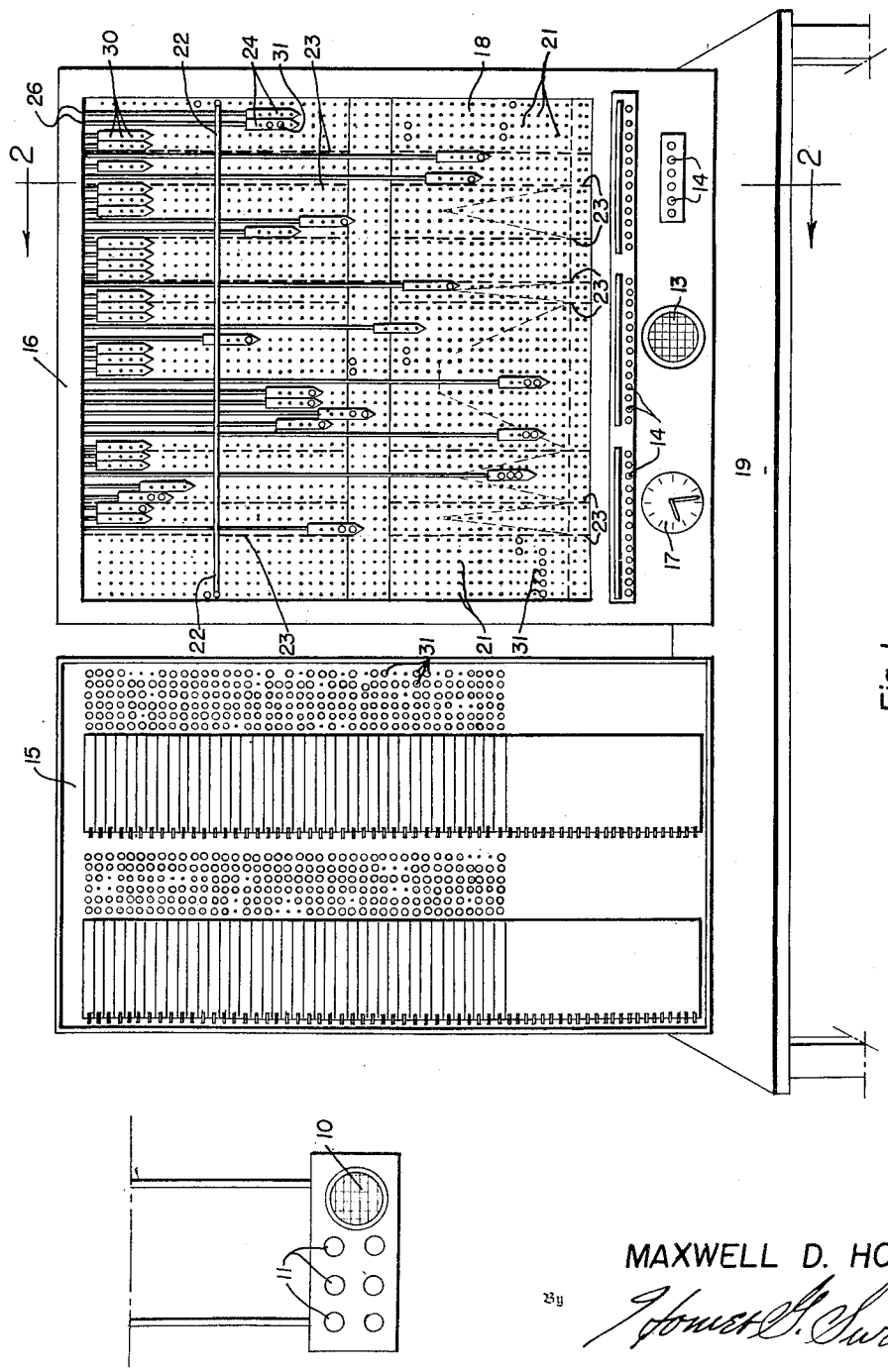

March 18, 1952     M. D. HOSKINS     2,589,812
WORK PROGRESS BOARD

Filed May 26, 1949     3 Sheets-Sheet 1

Inventor
MAXWELL D. HOSKINS
By Homer G. Sweet
Attorney

March 18, 1952     M. D. HOSKINS     2,589,812
WORK PROGRESS BOARD
Filed May 26, 1949     3 Sheets-Sheet 2
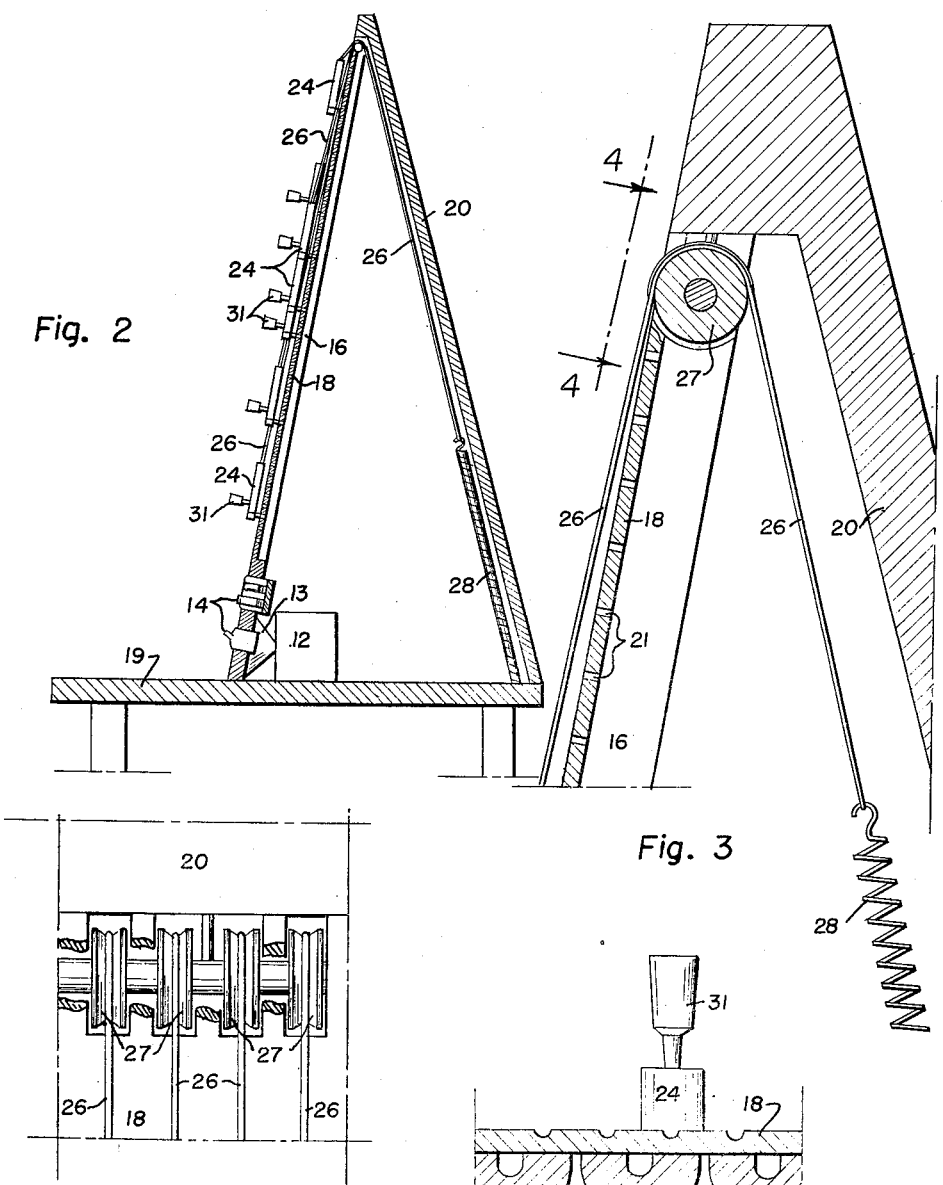
Inventor
MAXWELL D. HOSKINS
By Homer S. Sweet
Attorney March 18, 1952  M. D. HOSKINS  2,589,812
WORK PROGRESS BOARD
Filed May 26, 1949  3 Sheets-Sheet 3

Inventor
MAXWELL D. HOSKINS
By
Attorney

Patented Mar. 18, 1952

2,589,812

UNITED STATES PATENT OFFICE 2,589,812

WORK PROGRESS BOARD

Maxwell D. Hoskins, Denver, Colo.

Application May 26, 1949, Serial No. 95,470

4 Claims. (Cl. 35—24)

This invention relates to systems, facilities, and means for establishing and maintaining an accurate and comprehensive record of work assigned and in progress in a given establishment, and more particularly to such systems, facilities, and means centrally arranged for visual inspection to represent the allocation and condition of work in hand throughout the establishment at any selected moment of inspection, and has as an object to provide an improved such system, and the agencies appurtenant thereto, constituting a work progress board and central control station wherethrough a single operator may direct, regulate, and determine the progress of all work in a multi-department organization.

A further object of the invention is to provide an improved work progress control and indicating station susceptible of convenient single operator manipulation to accurately reflect the assignments, condition, and progress of all work under way or in hand in a multi-department establishment.

A further object of the invention is to provide an improved correlation of an intercommunicating system with a work progress board constituting a single operator control station for the direction and visual representation of work assignments and conditions obtaining within a multi-department establishment.

A further object of the invention is to provide an improved work progress board adapted and arranged to visually represent the assignments, condition, and progress of all work and available personnel pertinent to operation of a multi-department establishment.

A further object of the invention is to provide an improved work progress board particularly adapted to visually represent the operating conditions obtaining in a multi-department automobile servicing and repair establishment.

A further object of the invention is to provide an improved work progress board susceptible of single operator manipulation to visually represent the progress of all work operations significant to the functioning of automobile servicing and repair establishments.

A further object of the invention is to provide an improved work progress board for the comprehensive and accurate visual representation of operations significant to the functioning of multi-department establishments that is simple and inexpensive of production, convenient of single operator manipulation to at all times reflect the conditions actually obtaining, susceptible of advantageous adaptation to use in many and varied particular applications, easily variable in capacity to meet the needs of a given adaptation, and efficient in attainment of the ends for which designed.

With the foregoing and other objects in view, my invention consists in the construction, arrangement, and combination of elements hereinafter set forth, pointed out in my claims, and illustrated by the accompanying drawings, in which—

Figure 5:
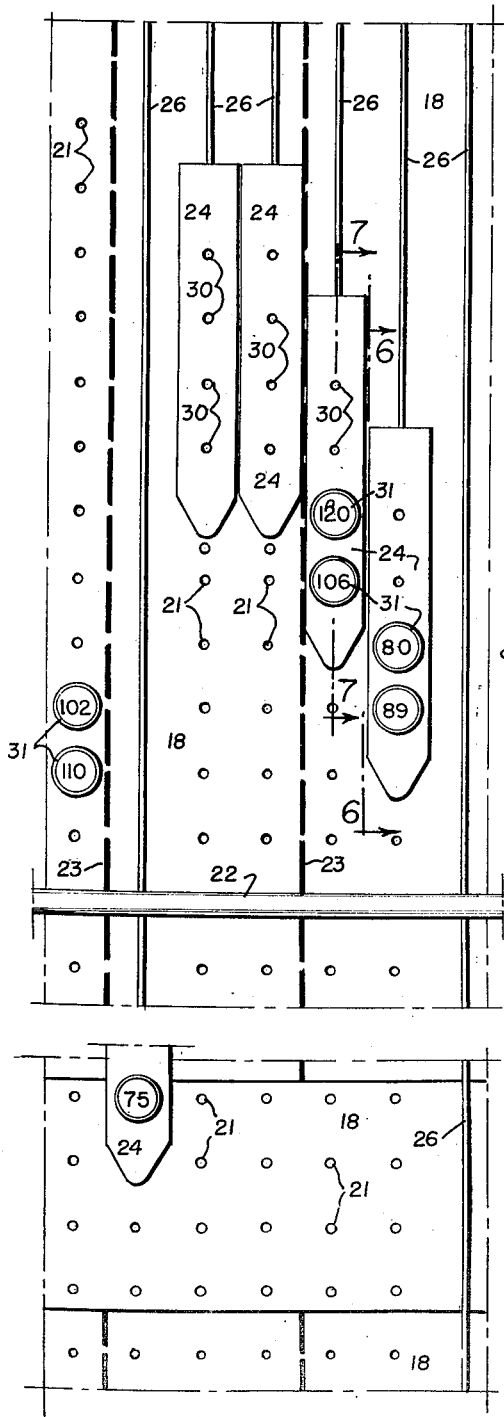
Figure 6:
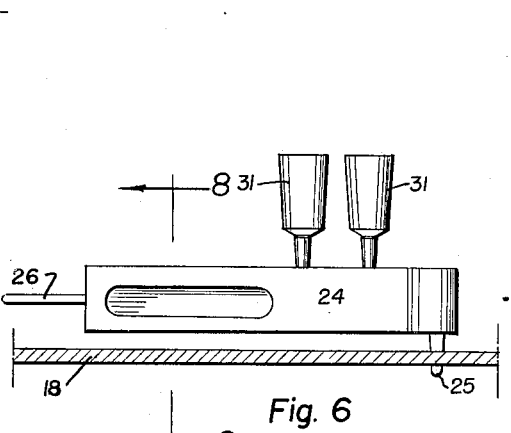
Figure 7:
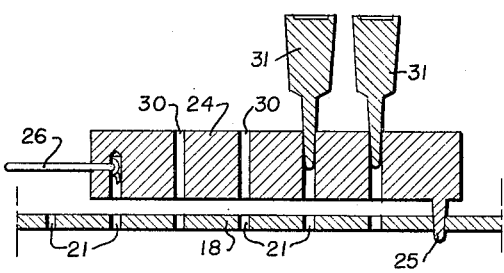
Figure 8:
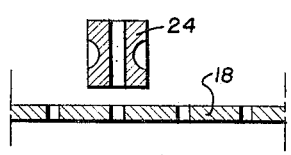

Figure 1 is a somewhat diagrammatic elevation of the elements, agencies and facilities constituting a complete work control station embodying the principles of the invention as typically arranged ready for practical use. Figure 2 is a vertical section taken substantially on the indicated line 2—2 of Figure 1. Figure 3 is a fragmentary, detail enlargement of the upper end portion of Figure 2, movable elements of the assembly being represented in alternative position. Figure 4 is a fragmentary, detail elevation of the area indicated generally by the line 4—4 of Figure 3. Figure 5 is a fragmentary, detail elevation, on an enlarged scale, of a portion of the work progress board shown in Figure 1, certain portions of the view being broken away to conserve space. Figure 6 is a fragmentary, detail section, taken substantially on the indicated line 6—6 of Figure 5. Figure 7 is a fragmentary, detail section, taken substantially on the indicated line 7—7 of Figure 5. Figure 8 is a cross section taken on the indicated line 8—8 of Figure 6. Figure 9 is a fragmentary, detail section through the work progress board as modified for alternative positioning of relatively movable elements thereon.

In many modern establishments, and particularly in those designed for the servicing and repair of automobiles, it is increasingly important, and increasingly difficult, to maintain a comprehensive, accurate check on the assignment, condition, and progress of work on hand and under way therein, thereby to facilitate customer satisfaction and operating efficiency, and it is to the provision of an improved system and pertinent facilities for such purpose that the instant invention is directed.

As is clearly shown in Figure 1, the improved system is centered in and operable from and through a single control station wherein the essential agencies are grouped and correlated for manipulation by a single operator. The control station pertinent to the improved system is served by any suitable arrangement for intercommunication between the station and the appropriate departments or sub-divisions of the establishment, thus to facilitate exchange of information as occasion may require, and a conventional installation of such intercommunicating means is represented in the drawings wherein the numeral 10 designates a loud speaker in association with conventional signalling means 11 operable to identify the remote station communicating through the speaker 10, and a transmitter 12 served by a microphone 13 under the control of switches 14 arranged to connect the transmitter and microphone for voice communication with a selected remote station. Supplementing the intercommunicating means of the typical control station, a conventional work sheet file 15 is provided in the usual form of an easel-type board faced with staggered folders wherein the separate work sheets pertinent to particular operations may be retained while the work is in progress to centralize all pertinent information in the control station. Completing the facilities of the station, a novel and improved work progress board, designated generally by the numeral 16, is mounted adjacent the file 15 in a size adequate for the operations to be represented thereupon and in a disposition, preferably approaching the vertical, convenient for inspection and manipulation, it being feasible and expedient to associate the transmitter 12, microphone 13, and switches 14 with the base of the board 16 adjacent a clock 17 indicative of time factors pertinent to operations on the board.

The board 16 may be of any particular construction suited to its purposes and to the functional relationships hereinafter set forth, said board being illustrated as including a plane, framed, visually-presented panel 18, of any desired substantially rigid material, upstanding at an inclination to the vertical from a support 19, and being braced against displacement by means of an angularly related back 20, or equivalent legs. In a typical embodiment, the exposed face of the panel 18 is regularly intersected by vertical rows of spaced holes 21, the holes in each of said rows being regularly and uniformly spaced apart to align transversely of the board. The spacing of the holes 21 in the vertical rows thereof represents uniform increments of time, it being convenient to assign an interval of 15 minutes to each space between adjacent holes in the row, so that the number of holes 21 from top to bottom of the panel 18 will be determined by the time lapse desired to be represented upon the board, an ordinary work day of 8 hours divided into quarter-hour intervals necessitating the provision of 33 holes 21 to each vertical row. As so constituted, a marker 22 end engaged in corresponding holes 21 of the vertical rows at the margins of the panel 18 and bridging across said panel serves to intersect all of the vertical rows at the same time designation, to facilitate determinations in relation to time readable from any or all of said rows. The number of vertical rows of holes 21 is determined by the number of work units or particular operations representing the capacity of the establishment to be served by the board, at least one such vertical row being required to maintain a given progress record, and said vertical rows may be grouped, even though uniformly spaced apart, as by means of marks 23 on the face of the panel 18, to conveniently embrace between adjacent such markings the number of work units or operations of like type which the establishment is prepared to conduct simultaneously. For example, an automobile servicing and repair establishment may be equipped to perform a plurality of different operations on different vehicles simultaneously, the facilities and equipment permitting the performance of a given operation upon but one vehicle at a time, in which event a single vertical row of holes 21 would be provided on the panel 18 for each such operation, and said single rows would be set off from one another by markings 23 indicative of the diverse character of the operations embraced therebetween, but where the facilities and equipment permitted simultaneous performance of a given operation on several different vehicles, the number of vertical rows of holes 21 between the appropriate markings 23 would correspond with the number of such like operations within the capacity of the establishment.

Whatever may be the number and grouping of the vertical rows of holes 21 on a given panel 18, each of said rows representative of a given work unit or operation has associated therewith a movably related shuttle 24 arranged for travel vertically therealong and for adjustable engagement therewith. As shown in the principal views of the drawings, the shuttles 24 are narrow, elongate blocks of a size to pass freely between adjacent like members and each provided with a tapered pin 25 projecting from its surface adjacent the panel 18 and at the leading lower end of the shuttle for shuttle-positioning engagement with a selected one of the holes 21 in the row served thereby, a cord 26, or equivalent element, fixed to the end of the shuttle remote from the pin 25 engaging over a roller 27 at the upper end of the panel and thence connecting with a resilient or elastic member 28 wherethrough tension is maintained on the cord 26 in a manner operable to return the associated shuttle 24 to the top of the panel 18 whenever the shuttle pin 25 is released from its engagement within a hole 21 of the corresponding row. As indicated in Figure 9, the shuttles 24 may be formed of or furnished with magnetically-reactive material and the various time stations of the shuttle path may be represented by magnets 29 suitably engaged with the rear face of the panel 18, so that positioning of a given shuttle 24 on the face of the panel 18 may be accomplished magnetically, thereby dispensing with the pin 25 and the cord 26, and elements 27 and 28, if desired; it being obvious that the shuttles may be themselves constituted as permanent magnets selectively positionable on a panel of magnetically-reactive material.

As should be readily manifest, each shuttle 24 is employed to portray the operative status of the assigned facilities and personnel represented by the vertical row of holes 21 wherewith it is associated, and such portrayal is accomplished through shifting of the shuttle vertically of the panel and spotting thereof on the panel with its nose at the appropriate time line indicative of completion of the operation assigned to the station typified by the shuttle. Thus, when a given station is clear of work the pertinent shuttle is left at the top of the panel in non-obstructing relation with the associated hole row, and a glance at the board immediately shows the availability of the station. Upon assignment of work to any station represented on the board, an estimate of the time required for the assigned work is made and the shuttle 24 of the station moved to such engagement with its associated hole row as will spot the shuttle with its nose against the transverse time line of the panel indicative of the time when the work assigned to that station should be finished, thereby visually denoting that the station is charged with work during the time span of the panel representation above the shuttle nose and open for work assignment during the time span represented below the shuttle nose. Obviously, successive assignments of work may be made to a given station and reflected upon the board through advance of the pertinent shuttle thereon to that time line indicative of the estimated completion time for all of the assigned work.

While the adjusted position of a given shuttle along its associated row of holes 21 is adequate to denote the open time available for work assignment at the corresponding station, additional information as to identity of the work piece at the station, identity of the workmen assigned to a given work piece, and the succession of multiple work piece assignments at such station, is essential to efficient allocation and correlation of work flow, and the improvement is designed to evidence such information in a simple and convenient manner. Facilitating the grouping of all significant information for felicitous visual reference, each of the shuttles 24 is formed or provided with a plurality of holes 30, or equivalent features, opening in spaced alignment longitudinally of and through the exposed shuttle face paralleling the panel 18 and each adapted to receive the tapered stem of and thereby mount a peg-type marker 31. The markers 31 are structurally alike for selective interchangeability in mounted engagement with the shuttle holes 30 and are provided in such number and variation of identification as may be appropriate for the manipulations involved in operation of a given board. Markers 31 are provided for designation and identification of particular work pieces, and also for designation and identification of individual workmen, and it is hence convenient to distinguish the two general classes of markers by color, or otherwise, and to distinguish the respective markers in each class by number, letter, or symbol displayed on the enlarged, flat head of the marker directed to view when the latter is seat-pegged in one of the holes 30, or elsewhere. When markers 31 for workmen identification are employed, but one such marker is ordinarily sufficient for each workman, and such markers may be pegged into holes 21 at the lower ends of the appropriate vertical rows marking the stations to which the workmen are assigned; but when conditions warrant workman assignment in anticipation of open time, it may be expedient to provide a number of identical markers 31 for each workman and group them at the foot of his normal assigned station for distribution to various work piece and station allocations distributive of the workman's time. Since it may be desirable to signal a number of work piece dispositions simultaneously, some such desirably being in advance, a number of identical markers 31 should be provided for each designation in the work piece class, and such markers may be efficiently and conveniently grouped in rows on the work sheet file 15, to which end a transverse row of holes may be aligned in the file panel or board with the exposed end of each file sheet or folder to receive the identical markers 31 representative of the work piece corresponding with the associated file, as is clearly shown in Figure 1, thereby correlating a given group of identical work piece markers with and for identification of the work piece represented by the various units of the file 15. With the arrangement shown, it is convenient to number or letter the file 15 units, as is common practice, and to correspondingly number or letter the group of identical markers 31 aligned therewith, so that the markers 31 corresponding with the designation of a given file 15 unit identify the work piece whereof the work sheet or data is entered in such file unit, wherever said markers may be spotted upon the panel 18 of the work progress board. Thus, when any file 15 unit is not charged with a work sheet or work data, the full quota of markers 31 appropriate thereto is removed from the panel 18 and aligned with said file unit, while the charging of a given file 15 unit is reflected by transfer of some, or all, of the markers 31 aligned therewith to positions on the panel 18 and shuttles 24 appropriate to represent on said panel the location, allocations, time commitments, and progress of the corresponding work piece and the operations thereto appertaining. In some adaptations of the improvement, it may be expedient to variously color or otherwise visually distinguish the several elements of a work piece marker 31 group indicative of common identity, thereby to enhance the facility of visual determinations as to work piece location and progress from the board; it being feasible, for example, to employ a distinguishable marker 31 to at all times represent on the board or shuttles the actual location of the corresponding work piece, to utilize a separately distinguishable marker from the same identity group to represent on the board time reserved in advance for subsequent operations upon such work piece, and to assign yet other distinguishable elements of the identity group for board representation of other allocations, commitments, and arrangements pertinent to the progress and disposition of the work piece. Obviously, the improved board and its markers may be used without the file 15, in which event the work piece markers 31 would be banked ready for use in any suitable arrangement on or conveniently adjacent the board comprised from the panel 18 and associated elements.

Provision of the markers 31 in association with the shuttle-equipped board as above described accommodates the development of various practical systems of use adapted to the particular needs and capacities of a given establishment. Through proper spotting and manipulation of the shuttles and markers, the condition and progress of all work within the establishment may be made visually manifest on the panel 18 in a manner simultaneously denotive of the establishment capacity, in both personnel and facilities, immediately uncharged and also subsequently to be available. Typical of one such system adaptable to use in an automobile servicing and repair establishment, the board and marker manipulations incident to allocation and portrayal of a work order calling for valve grind, tune-up, lubrication, and washing of an incoming work piece might follow the pattern hereinbelow set forth. The floor attendant receiving the work piece makes out the work order and, through reference to the control station attendant, determines the time for delivery of the completed work and marks such time on the order, whereof a copy is then delivered to the control station attendant. When the order is made it is assigned an available file 15 number and the designation of such number duplicated on the markers 31 becomes the work piece designation on the progress board and through the various operations of the establishment. Selecting the proper marker 31, the control station attendant finds an open shuttle line in the valve grind area of the panel 18 and an available valve grind mechanic marker-indicated at the foot of the area, hence the incoming work piece is immediately assigned to such area by inserting the work piece marker in the lower or nose hole of the shuttle, inserting the workman marker in the next-upwardly open hole of the shuttle, and moving the shuttle to engagement with its hole 21 row to dispose the shuttle nose at the time line indicating completion of the valve grind operation. Taking a second work piece marker 31 from the appropriate bank, the attendant finds all of the tune-up area lines currently charged with work, hence he inserts the incoming work piece in one of the hole 21 lines of the tune-up area, selecting as a seat for said marker that hole of the appropriate line which marks a time interval upwardly from the line lower end or close of the working day corresponding with the so-allocated job time estimate, thereby appropriating and budgeting the work time represented by said line. Reference to the wash rack area showing facilities and personnel available there at the time the tune-up will be finished, a third work piece marker is selected and inserted in one of the wash rack line 21 holes to demark thereon the job time estimate measured upwardly from the work day close or previously-inserted marker, thus reserving such time for the incoming work without obstructing the open line thereabove, and similar provision is made in the lubrication area of the panel for reservation of time for the work incoming from the wash rack, thereby insuring smooth and efficient routing of the work piece from operation to operation while maintaining a visual record of the work progress and the availability of facilities and personnel. A fifth of the appropriate work piece markers is spotted in a delivery area of the panel at the time agreed upon for delivery of the finished work, and as the work piece progresses from station to station the marker indicative of work piece actual location is advanced correspondingly on the board in replacement of the reservation markers, thereby at all times giving visual evidence of the exact location of all work in the establishment, until such actual location marker replaces the delivery time marker of the corresponding work piece to evidence completion of the work order. Thus, with suitable area designations on the panel 18, a shuttle-served row of holes 21 for each operational line or facility of the establishment, a marker for each workman, and a suitable number of work piece markers 31 susceptible of correlation with work sheet files or orders, a complete, accurate, and current visual record of work progress, condition, and allocation within the establishment is continuously maintained without recourse to the making and keeping of involved, onerously difficult, and error susceptible chirographical records.

Supplemented by an intercommunicating system arranged to facilitate immediate exchange of information between the control station attendant and the various operating areas of the establishment, the improved work progress board provides a visual record susceptible of convenient manipulation and adjustment to at all times accurately portray the location and progress of all work within the establishment, the current condition and availability of operating facilities and personnel, the work commitments made and to be met, and the capacity of the establishment applicable to incoming work, thereby enhancing the operating efficiency of the establishment, minimizing delays, confusion, and operating conflicts, and establishing a centralized record from which solutions to all work flow and progress problems of the establishment may be promptly read.

Since changes, variations, and modifications in the form, construction, and arrangement of the elements shown and described may be had without departing from the spirit of my invention, I wish to be understood as being limited solely by the scope of the appended claims, rather than by any specific details of the illustrative showing and foregoing description.

I claim as my invention:

1. A work progress board for central station representation and control of conditions and operations in a multi-department establishment, comprising a panel surface-divided into uniform intervals of time, departmental area representations on said panel perpendicular to the denoted time intervals, paths in said areas perpendicularly traversing the time intervals for the respective departmental operating facilities, a shuttle shiftable along each of said paths for selective registration with said time intervals, and means for selectively and interchangeably marking said shuttles and the path and time interval intersections with multiple particular work piece and workman identifications, wherein the shuttle path and time interval intersections are marked as holes of uniform size in the panel, the shuttles are yieldably maintained at one end of their respective travel paths, and each of said shuttles is equipped with a fixed peg directed toward the panel face for selective engagement with the panel holes of its path to register the shuttle nose with a predetermined time interval and with a plurality of marker peg seats spacedly aligned in the exposed face thereof.

2. A work progress board for central station representation and control of conditions and operations in a multi-department establishment, comprising a panel surface-divided into uniform intervals of time, departmental area representations on said panel perpendicular to the denoted time intervals, paths in said areas perpendicularly traversing the time intervals for the respective departmental operating facilities, a shuttle shiftable along each of said paths for selective registration with said time intervals, and means for selectively and interchangeably marking said shuttles and the path and time interval intersections with multiple particular work piece and workman identifications, wherein the shuttle path and time interval intersections are marked as holes of uniform size in the panel, the shuttles are yieldably maintained at one end of their respective travel paths for selective adjustment and retention relative to said time intervals, exposed shuttle faces remote from said panel are furnished with a plurality of spacedly aligned holes corresponding in size with the panel holes, and the means for selectively and interchangeably marking the shuttles and time interval and shuttle path intersections comprise characteristically identified pegs engageable in the panel and shuttle holes.

3. A work progress board for central station representation and control of conditions and operations in a multi-department establishment, comprising a panel surface-divided into uniform intervals of time, departmental area representations on said panel perpendicular to the denoted time intervals, paths in said areas perpendicularly traversing the time intervals for the respective departmental operating facilities, a shuttle shiftable along each of said paths for selective registration with said time intervals, a plurality of spacedly aligned holes intersecting the exposed face of each shuttle remote from the panel, and characteristically identified work piece and workman designating pegs receivable in said holes.

4. In a work progress board for central station representation and control of conditions and operations in a multi-department establishment having a panel surface-divided into uniform intervals of time and a path perpendicularly traversing the denoted time intervals for each operating facility of the establishment, a shuttle shiftable along each of said paths for selective registration with said time intervals, holes marking the path and time interval intersections, a spacedly aligned plurality of like holes intersecting the exposed face of each shuttle remote from the panel, and characteristically identified work piece and workman designating pegs receivable in said holes.

MAXWELL D. HOSKINS.

REFERENCES CITED

The following references are of record in the file of this patent:

UNITED STATES PATENTS

| Number | Name | Date |
|---|---|---|
| 926,386 | Chappell | June 29, 1909 |
| 1,417,928 | Lord | May 30, 1922 |
| 1,600,358 | Puckette | Sept. 21, 1926 |
| 1,790,127 | Whitcomb | Jan. 27, 1931 |
| 2,183,183 | Burck | Dec. 12, 1939 |
| 2,412,238 | Wassell | Dec. 10, 1946 |
| 2,484,058 | Steinberger | Oct. 11, 1949 |